United States Patent
Sere et al.

(10) Patent No.: US 10,628,249 B2
(45) Date of Patent: Apr. 21, 2020

(54) METHOD FOR PROTECTING AN ELECTRONIC DEVICE AGAINST FAULT INJECTION ATTACKS DURING EXECUTION OF A PROGRAM

(71) Applicant: IDEMIA IDENTITY & SECURITY FRANCE, Issy-les-Moulineaux (FR)

(72) Inventors: Ahmadou Sere, Issy les Moulineaux (FR); Cyrille Pepin, Issy les Moulineaux (FR); Michel Benchetrit, Issy les Moulineaux (FR)

(73) Assignee: IDEMIA IDENTITY & SECURITY FRANCE, Issy les Moulineaux (FR)

( * ) Notice: Subject to any disclaimer, the term of this patent is extended or adjusted under 35 U.S.C. 154(b) by 161 days.

(21) Appl. No.: 15/940,904

(22) Filed: Mar. 29, 2018

(65) Prior Publication Data

US 2018/0285189 A1    Oct. 4, 2018

(30) Foreign Application Priority Data

Mar. 30, 2017 (FR) .................................. 17 52704

(51) Int. Cl.
*G06F 11/00* (2006.01)
*G06F 11/07* (2006.01)
(Continued)

(52) U.S. Cl.
CPC ........ *G06F 11/0772* (2013.01); *G06F 3/0619* (2013.01); *G06F 11/073* (2013.01);
(Continued)

(58) Field of Classification Search
CPC .. G06F 3/0619; G06F 11/073; G06F 11/0772; G06F 21/52; G06F 21/55
See application file for complete search history.

(56) References Cited

U.S. PATENT DOCUMENTS 7,346,780 B2 * 3/2008 Sinha .................. G06F 21/52
713/176
10,423,779 B2 * 9/2019 Horne ................ G06F 11/3624
(Continued)

FOREIGN PATENT DOCUMENTS

EP   2043017 A1   4/2009
FR   2864655 A1   7/2005

OTHER PUBLICATIONS

Preliminary Research Report received for French Application No. 1752704, dated Oct. 24, 2017, 3 pages (1 page of French Translation Cover Sheet and 2 page of original document).

*Primary Examiner* — Joshua P Lottich
(74) *Attorney, Agent, or Firm* — Womble Bond Dickinson (US) LLP

(57) ABSTRACT

The present invention relates to a method for executing a program (P) in an electronic device such as a smart card, including:
  computing, during execution of the program (P), an integrity datum (X1, X12) relating to a set (E) of code instructions of program (P), the set (E) having a single code instruction (Inst_1) or a sequence of code instructions (Inst_1, Inst_2) intended to be implemented consecutively,
  after computation of the integrity datum, executing a last code instruction of the set (E) by a processor of the electronic device,
  after execution of the last code instruction, integrity checking the set (E) on the basis of the computed integrity datum (X1, X12), to generate a result,
  signaling or not signaling an error as a function of the generated result.

17 Claims, 7 Drawing Sheets

(51) Int. Cl.
*G06F 3/06* (2006.01)
*G06F 21/52* (2013.01)
*H04L 9/00* (2006.01)
*G06F 21/55* (2013.01)

(52) U.S. Cl.
CPC .............. *G06F 21/52* (2013.01); *G06F 21/55* (2013.01); *H04L 9/004* (2013.01)

(56) References Cited

U.S. PATENT DOCUMENTS

| | | | |
|---|---|---|---|
| 2003/0023856 A1* | 1/2003 | Horne | G06F 11/3624 713/187 |
| 2006/0047955 A1 | 3/2006 | Prevost et al. | |
| 2013/0006949 A1* | 1/2013 | Essawi | G06F 21/552 707/703 |
| 2013/0007420 A1* | 1/2013 | Van Assche | G06F 21/52 712/220 |

* cited by examiner

METHOD FOR PROTECTING AN ELECTRONIC DEVICE AGAINST FAULT INJECTION ATTACKS DURING EXECUTION OF A PROGRAM

FIELD OF THE INVENTION

The present invention relates to a method for executing a program in an electronic device such as a smart card, and to such an electronic device.

The invention advantageously finds application in the field of programs intended to be interpreted by a high-level virtual machine.

STATE OF THE ART

In manner known per se, in a fault injection attack the physical environment of an electronic device is perturbed so as to modify data stored by the device. Such perturbations can be produced in different manners: variation in power voltage, variation in clock frequency of the device, emission of electromagnetic or laser radiation, etc.

These data may be code instructions of a program for example intended to be executed by the electronic device.

To protect an electronic device against such attacks, it was proposed in document US 2006/0047955 A1 to compute a check value for a block of code instructions of a program, before execution of this program is initiated. These check values are stored in a memory of the device.

At a later time, the program is launched by the processor. During execution of the program, the integrity of a block of the program is checked on the basis of the corresponding check value, previously computed and stored, before launching the program. If the block fails this integrity check, an error is reported.

However, between the instant the check value is computed and the later instant when the integrity check is performed on the basis of this check value, there may be a lengthy time lapse. An attack carried out during this period may corrupt a stored check value and/or the corresponding block, thereby making ineffective the protection imparted by the method in document US 2006/0047955 A1.

SUMMARY OF THE INVENTION

It is one objective of the invention to provide more efficient protection for the code instructions of a program intended to be executed by an electronic device, against fault injection attacks.

In a first aspect of the invention a method is therefore proposed for executing a program in an electronic device such as a smart card, comprising steps of:
  computing a first integrity datum relating to a set of code instructions of the program, the set comprising a single code instruction or sequence of code instructions intended to be executed consecutively,
  after computation of the first integrity datum, executing a last code instruction of the set by a processor the electronic device,
  after execution of the last code instruction, integrity checking the set on the basis of the first computed integrity datum, the integrity check comprising repeat of the computing step to produce a second integrity check value relating to the set of code instructions of the program, and comparing the two computed integrity check values,
  signaling or not signaling an error as a function of the result of comparison,
wherein the first integrity datum is computed during execution of the program.

The method in this first aspect of the invention may also comprise the following characteristics, taken alone or in combination whenever technically possible.

The first integrity datum can be computed after execution by a processor of the electronic device:
  of at least one first code instruction of the program by a processor of the electronic device, or
  of at least one code instruction of the set differing from the last code instruction, or
  of each code instruction of the set except the last code instruction of the set, The method in the first aspect of the invention may further comprise the following steps:
  after execution of the last code instruction of the set, verification of at least one predetermined condition which may or may not be met by a following code instruction of the program to be executed after the last code instruction,
  wherein the integrity check is implemented only if at least one of the conditions is met, before any execution of the following code instruction by a processor of the electronic device.

The integrity check of the set of code instructions can be implemented only when at least one of the following conditions is met:
  the following code instruction is a branch,
  the following code instruction, when executed by a processor of the electronic device, participates in communication of data between the electronic device and a device external to the electronic device,
  the following code instruction, when executed by a processor of the electronic device, participates in writing of data in a non-volatile memory 8 of the electronic device.

In addition, the integrity check of the set of code instructions may also be implemented when the following code instruction is not fully contained in a predetermined memory region of the electronic device.

The method in the first aspect of the invention may further comprise the following steps:
  during execution of the program, computing an integrity datum relating to a predetermined memory region of the electronic device containing the set of code instructions,
  after execution of the last code instruction of the set, integrity checking the predetermined memory region on the basis of an integrity datum relating to the predetermined memory region, to generate a second result,
  signaling or not signaling an error as a function of the second result.

After execution of the last code instruction of the set, verification can be carried out of at least one predetermined condition which may or may not be met by a following code instruction of the program to be executed after the last code instruction, in which case the integrity check of the predetermined memory region is implemented only if at least one of the predetermined conditions is met, before any execution of the following code instruction by a processor of the electronic device.

The integrity check of the predetermined memory region can be implemented only when the integrity check of the set of code instructions is implemented.

The method may further comprise loading of the set of code instructions from a predetermined region of a non-volatile memory of the electronic device into a cache in a volatile memory of the electronic device, wherein the steps of computing, executing and integrity checking are then implemented from the cache.

The method in the first aspect of the invention may also comprise selection of an execution mode of the set of code instructions from a plurality of execution modes comprising:
- a cached execution mode, wherein loading of the set of code instructions into the cache is implemented and wherein the steps of computing, executing and integrity checking are implemented from the cache, and
- a non-cached execution mode, wherein the steps of computing, executing and integrity checking are implemented directly from the predetermined region of the non-volatile memory.

The step to select an execution mode can then be repeated for at least one code instruction of the program that is not fully contained in the predetermined region of the non-volatile memory, the selected execution mode varying from one implementation to another.

Selection of the execution mode may be random for example.

The method in the first aspect of the invention may also comprise the following steps:
- after execution of the last code instruction of the set, adding to the set a following code instruction of the program to be executed after the last code instruction,
- after addition, iterative repeating of the steps of computing, executing and optionally integrity checking and signaling.

The method in the first aspect of the invention may also comprise the following steps:
- after execution of the last code instruction of the set, redefining the set to the only following code instruction when the following code instruction is not fully contained in a predetermined memory region of the electronic device,
- after redefining of the set, iterative repeating of the steps of computing, executing and optionally integrity checking and signaling.

The method in the first aspect of the invention may also comprise the following steps:
- storing an integrity datum relating to the set, computed when implementing the computing step of code instructions, in a predetermined memory location of the electronic device,
- storing a set-related integrity datum, computed on later implementation of the computing step, in the predetermined memory location so as to replace the previously stored integrity datum.

Integrity checking of reference data for which an integrity datum has previously been computed, may comprise substeps of:
- repeating the preceding computing step to produce a new integrity check value relating to the reference data,
- comparing the two integrity check values relating to the reference data, an error being signaled only if the two compared integrity check values are identical.

The steps can be implemented by a high-level virtual machine, such as a Java Card virtual machine, the program being interpretable by the high-level virtual machine.

In a second aspect of the invention, there is also proposed a computer program product comprising program code instructions to execute steps of the method according to the first aspect of the invention when this method is executed by at least one processor.

This program may be a high-level virtual machine.

In a third aspect of the invention, there is also proposed an electronic device such as a smart card, comprising:
- a memory adapted to store a program comprising a set of code instructions, the set comprising a single code instruction or a sequence of program code instructions intended to be executed consecutively,
- at least one processor configured:
  - to compute an integrity datum relating to the set of code instructions,
  - after computation of the integrity datum, to execute a last code instruction of the set by a processor of the electronic device,
  - after execution of the last code instruction, to check the integrity of the set of code instructions on the basis of the computed integrity datum, to generate a result,
  - signaling or not signaling an error as a function of the generated result, wherein the integrity datum is computed during execution of the program.

DESCRIPTION OF THE FIGURES

Other characteristics, objectives and advantages of the invention will become apparent from the following description that is solely illustrative and nonlimiting, and is to be read in connection with the appended drawings in which.

In all the Figures, similar elements carry same references.

DETAILED DESCRIPTION OF THE INVENTION

Electronic Device Protected Against Fault Injection Attacks

Figure 1:
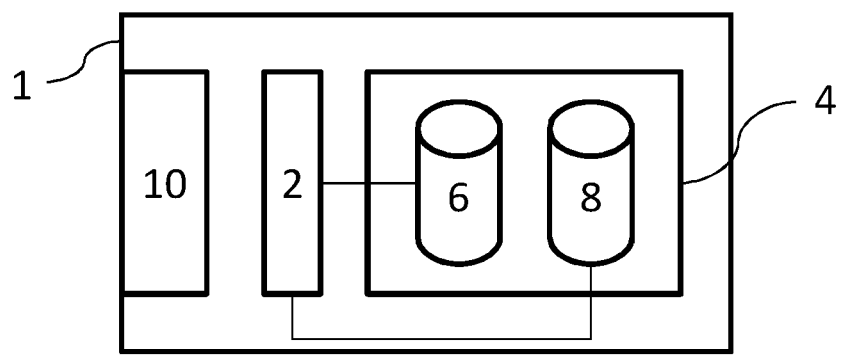
FIG. 1 schematically illustrates an electronic device according to one embodiment of the invention.

With reference to FIG. 1, an electronic device 1 comprises at least one processor 2 and at least one memory 4.

For example, the electronic device 1 is a smart card such as a SIM card.

The or each processor 2 is adapted to execute program code instructions belonging to a set of predetermined code instructions called "native" code instructions in the reminder hereof.

The memory 4 comprises at least one volatile memory 6 e.g. of RAM type. The function of the volatile memory 6 is temporarily to store data e.g. data computed by the processor 2. The content of the volatile memory 6 is erased when the electronic device 1 is switched off.

The memory 4 also comprises at least one non-volatile memory 8 (NVM), for example of hard disk, SSD, flash, EEPROM type, etc. The function of the non-volatile memory 8 is to store data persistently by which it is meant that if the electronic device 1 is switched off the content of the non-volatile memory 8 is not erased.

The electronic device 1 also comprises a communication interface 10 with a third-party device external to the electronic device 1. This communication interface 10 may comprise a wireless communication circuit e.g. a NFC chip, to set up a radio communication channel between the electronic device and the third-party device, and/or it may comprise at least one port intended to be placed in physical contact with at least one port of the third-party device so that data-carrying electric signals are able to be transferred between the ports placed in physical contact.

Figure 2:
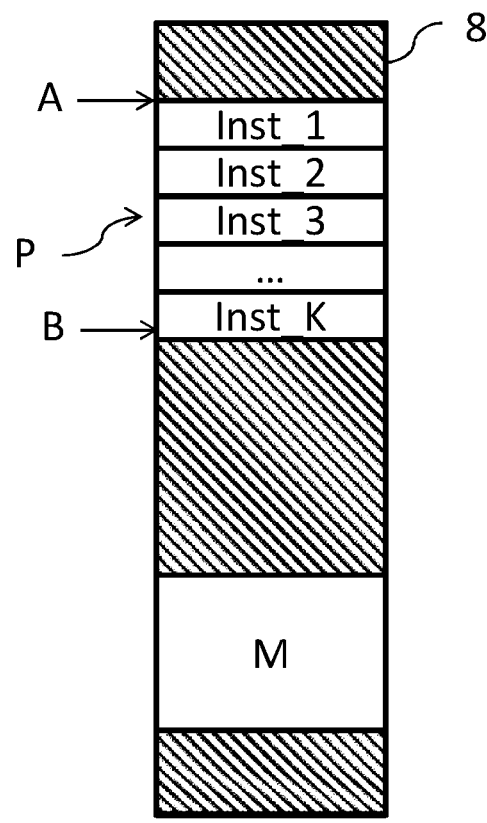
FIG. 2 schematically illustrates a memory of the device schematically illustrated in FIG. 1, containing a target program P intended to be executed by this device.

With reference to FIG. 2, at least two programs are stored in the non-volatile memory 8: at least one target program P and a program M to check integrity of the target program P.

The target program P is in the form of a binary file having a start address A and an end address B in the non-volatile memory 8.

The target program P comprises K code instructions Inst_1 to Inst_K. Each code instruction Inst_i of the target program P is formed of a sequence of bits in this binary file. The target program P particularly comprises a first code instruction Inst_1, forming an entry point to the target program P.

As will be seen below, the integrity checking program M ensures an integrity checking function of the code instructions of the target program P during execution of the target program P.

The code instructions of the target program P may be native or non-native. If the code instructions of the target program P are non-native, a high-level virtual machine is stored in the non-volatile memory 8 of the device 1. The high-level virtual machine is a program comprising native code instructions. One function of the virtual machine is to interpret the code instructions of the target program P and to translate the same to native code instructions.

For example, the high-level virtual machine is a Java Card virtual machine. It is then configured to interpret a "byte-code" derived from a source code in Java programming language, which is an object-oriented programming language.

The integrity checking program M can be the high-level virtual machine. In this case, the virtual machine accumulates the aforementioned functions of interpretation/translation and integrity checking. This nonlimiting embodiment will be used as example in the remainder of the present description.

Method for Protecting Against Fault Injection Attacks (First Embodiment)

Figure 3:
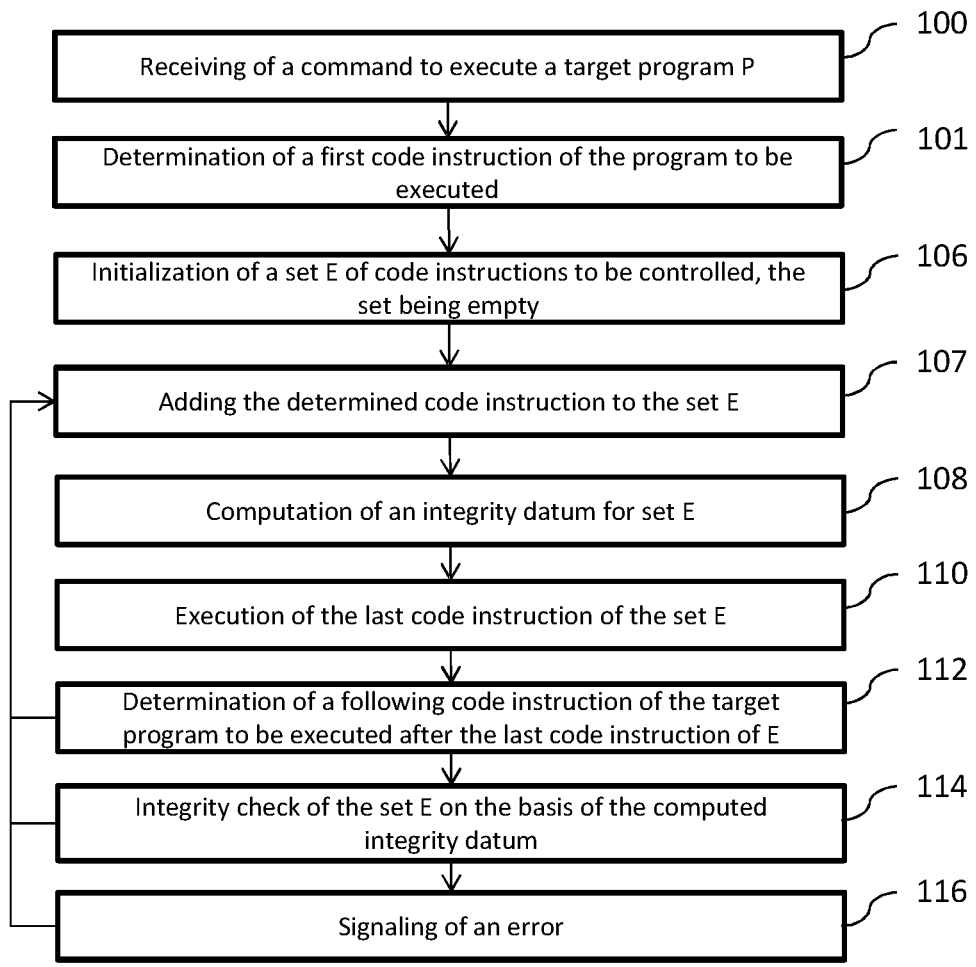
FIG. 3 is a flowchart of steps of the method for executing a program according to a first embodiment of the invention.

With reference to FIG. 3, a method for protecting the electronic device 1 against fault injection attacks according to a first embodiment comprises the following steps.

The processor 2 starts up execution of the virtual machine M for example on powering-up of the electronic device 1.

At a later time, the virtual machine M receives a command to launch the target program P (step 100). Herein, it is considered that execution of the target program P starts when an execution command is received in the electronic device 1.

In response to receiving of this command, the virtual machine M determines a first code instruction of the target program P to be executed (Inst_1 in the case in FIG. 2) (step 101). This step 101 comprises locating of the start address A of the target program P in the non-volatile memory 8 and in particular the sequence of bits forming the first code instruction Inst_1 in the non-volatile memory 8.

In addition, the virtual machine M initializes a set E of code instructions that is an empty set (step 106). It will be see below that this set E is intended to comprise code instructions of the target program P, the integrity of which is to be checked. For example, this set is represented by a table held by the virtual machine M.

The virtual machine M adds the first code instruction to the set E of code instructions (step 107). After this addition, set E therefore only contains one element: the first code instruction Inst_1.

The two steps 106 and 107 can be combined in a single step to reduce the set E to a singleton.

After step 107, the virtual machine M computes an integrity datum relating to the set of code instructions E (step 108).

The step to compute an integrity datum 108 comprises the application of a predetermined integrity function F to the bits of each code instruction included in set E. The integrity datum relating to set E is the image of these bits by the integrity function F. The integrity function F may be: the identity function, a hash function, a function generating a longitudinal redundancy check (LRC), a function generating a cyclic redundancy check (CRC), etc.

At this stage, an integrity datum X1 is computed at step 108 relating solely to the first code instruction Inst_1, which has not yet been executed.

Figure 4:
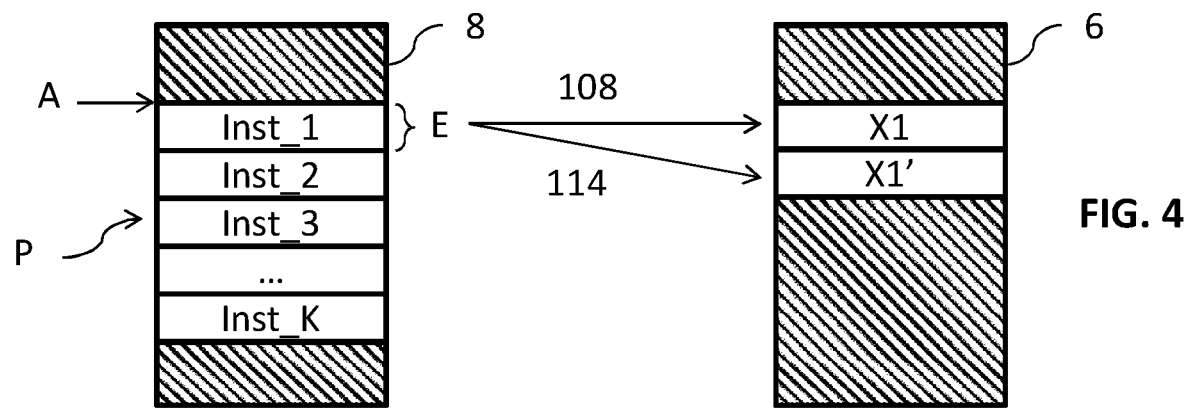
FIGS. 4 and 5 illustrate the content of the memories of the device at different instants in time during implementation of the method according to the first embodiment of the invention.

The integrity datum X1 resulting from this computation 108 is stored in the memory 4 in a first memory location. The first memory location is preferably in the volatile memory 6 as illustrated in FIG. 4, in particular to avoid use of the non-volatile memory 8 the lifetime of which is dependent on the number of writes therein.

The processor 2 then executes the last code instruction of the set of code instructions (step 110). By "last" code instruction is meant the code instruction to be executed last among the code instructions included in set E.

At this stage, set E only comprises the first code instruction Inst_1 of the target program P: the last code instruction of the set E is therefore Inst_1. At execution step 110, the virtual machine M interprets the first code instruction Inst_1, to translate the same to at least one native code instruction, directly interpretable by the processor 2 following a method known per se.

After execution 110 of the last code instruction of the set E, the virtual machine M determines a following code instruction of the target program P, to be executed just after the last code instruction of the set E (step 112), however without executing this following instruction.

In most cases, the following code instruction is located immediately below the last code instruction of the set E in the non-volatile memory 8. In other words, the start address of the following code instruction is equal to the end address of the last code instruction of the set E. However, in some cases, the following code instruction is located at another address. This is the case for example if the last code instruction of the set E is a branch. In this case, the last code instruction of the set E comprises addressing data allowing determination of the address of the following code instruction (these addressing data being in the form of a relative or offset address).

It is assumed here that the code instruction following after code instruction Inst_1 is code instruction Inst_2.

At the determination step 112, the virtual machine M checks whether at least one predetermined condition is met by the following code instruction, without causing it to be executed however by the processor 2.

After determination step 112 of the following code instruction, the virtual machine M implements an integrity check of the set of code instructions E on the basis of the computed integrity datum, to generate a result (step 114).

The integrity check 114 is implemented when at least one of the predetermined conditions is met by the determined following instruction (here as a function code instruction Inst_2).

For example, the integrity check 114 is implemented selectively when it is determined, at determination step 112 of the following code instruction, that at least one of the following conditions is met:
- the following code instruction, when executed by the processor 2, participates in communication of data between the electronic device 1 and a device external to the electronic device 1,
- the following code instruction, when executed by the processor 2, participates in writing of data in the non-volatile memory 8 of the electronic device 1,
- the following code instruction is a branch.

If none of these conditions is met, the integrity check 114 of the set of code instructions E is not carried out.

The integrity check 114 of the set of code instructions E comprises sub-steps of:
- repeating the computing step 108 by applying the integrity function F to each code instruction of the set E stored in the non-volatile memory 8 (here only code instruction Inst_1), to produce a new integrity datum X1',
- storing the new integrity datum X1' in a second memory location differing from the first memory location containing the integrity datum X1, preferably in the volatile memory 6 as illustrated in FIG. 4,
- comparing the two computed integrity data X1 and X1'.

If the two integrity data X1 and X1' have different values, an error is signaled by the virtual machine M (step 116). It is effectively possible that an attack via injection of fault has taken place after launching of the program; such a difference between the two compared values may be caused by the occurrence of such an attack.

For example at step 116 the virtual machine M raises a security exception, this exception indicating such an error.

An error is signaled 116 for example in the virtual machine M (i.e. by one portion of the program of the virtual machine M to another portion of the program of the virtual machine M) and/or is signaled by the virtual machine M to a third-party program in the electronic device and/or is signaled to a third-party device via the communication interface 10.

No error is signaled if both integrity data X1 and X1' are identical.

If the error signaling step 116 is implemented, various measures can be taken: for example, halting of execution of the target program P or a more radical measure e.g. complete stoppage of the electronic device 1.

If no decision is taken to stop execution of the target program P, the virtual machine M repeats step 107: the virtual machine M adds to set E the following code instruction determined at step 112. At this stage, set E therefore changes over from a single code instruction (Inst_1) to a sequence of two instructions intended to be executed consecutively (Inst_1, Inst_2). After the addition 107, the code instruction Inst_2 replaces code instruction Inst_1 as the last code instruction in set E.

Figure 5:
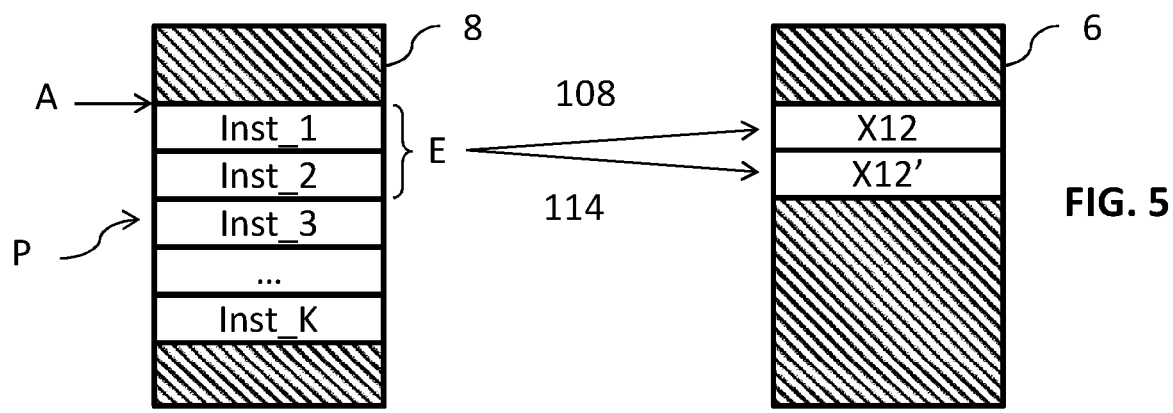

The computing step 108 is then repeated: an integrity datum X12 relating to set E formed of the sequence Inst_1, Inst_2 is then computed. The integrity datum X12 is stored in the first memory location so as to replace therein the previously computed value X1 as illustrated in FIG. 5.

Step 110 to execute the last code instruction of the set E is then repeated: in other words, code instruction Inst_2 is executed here.

Next, step 112 to determine a following instruction of the target program P to be executed is again carried out. For example, the following instruction is Inst_3.

The integrity check step 114 is then optionally repeated to check the integrity of the set E formed of the sequence of consecutive instructions Inst_1 and Inst_2, as a function of the following code instruction Inst_3, so as to produce a new result. This new implementation of the integrity check step 114 therefore comprises:
- repeat of computing step 108 by applying the integrity function F to the set E formed of code instructions Inst_1 and Inst_2 stored in the non-volatile memory 8, to produce a new integrity check value X12', and
- storing the integrity datum X12' in the second memory location, so as to replace therein the value X1' computed at step 108,
- comparing both integrity data X12 and X12'.

The first code instruction Inst_1 has already been executed by the processor 2. As a result, the virtual machine M returns to the binary file of program P and again reads the sequence of bits forming the first code instruction Inst_1 and also reads the sequence of bits of the second code instruction Inst_2 to obtain the integrity datum X12.

The error signaling step 116 is optionally repeated i.e. implemented selectively if the integrity data X12 are X12' are different.

Steps 107, 108, 110, 112, and optionally 114 even 116 are then repeated by the virtual machine M for each following code instruction of the target program P. On each new implementation of the computing step 108, an integrity datum is computed relating to an increasingly greater set E of code instructions of program P.

It is possible to repeat steps 107 et seq. up until termination of the target program P.

Such a termination occurs for example when it is determined at an implementation of step 112 that there does not exist any following code instruction of the target program P to be executed, or else when the virtual machine M receives a command to terminate the target program P.

Method for Protecting Against Fault Injection Attacks (Second Embodiment)

In the first embodiment, the set E of code instructions, the integrity of which is checked, continues to increase throughout execution of the target program P.

In a second embodiment, the following additional steps are implemented to limit the size of this set E, and thereby reduce the maximum duration of computing steps 108 and integrity check steps 114.

Figure 6:
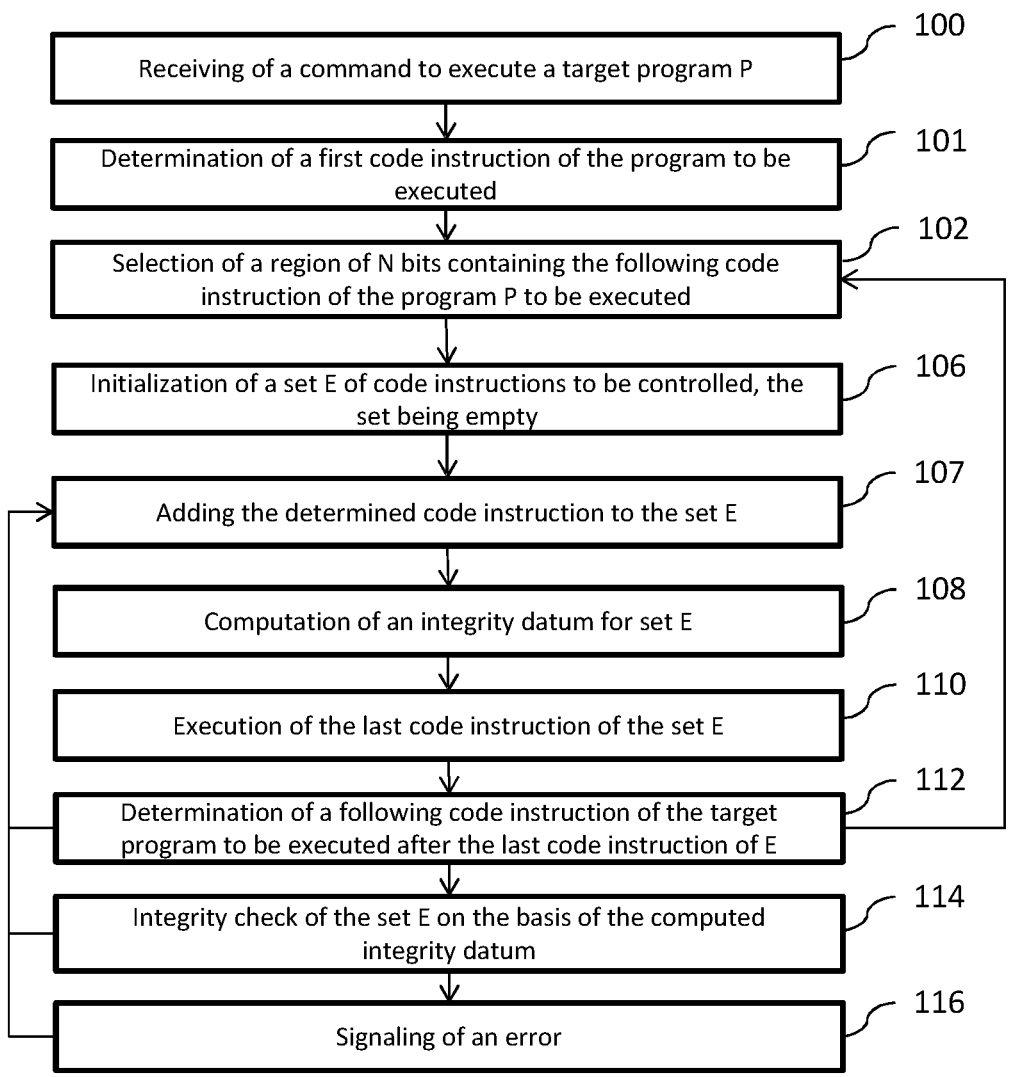
FIG. 6 is a flowchart of steps of a method for executing a program according to a second embodiment of the invention.

With reference to FIG. 6, the virtual machine M selects a region of the non-volatile memory 8 having a predetermined size of N bits, this region containing the following code instruction of the target program P to be executed (step 102). Typically, the start address of the selected region is the start address of the following code instruction to be executed.

This step 102 is implemented for the first time after step 101 at which the first code instruction of the target program P was determined (Inst_1). The selected region therefore comprises instruction Inst_1, which is the following instruction to be executed.

When it is later determined, at an implementation of step 112, that a following code instruction to be executed just after the last code instruction of the set E, is not included in the selected region of N bits, or is only partly contained in this region, the virtual machine M then repeats step 102: it selects a new region of the non-volatile memory 8 of size N containing the following instruction to be executed that was determined at the last implementation of step 112.

The initialization step 106 is repeated to empty set E, then step 107 is performed at which the following instruction to be executed is added to set E. In other words, set E is reduced to only the following instruction of the target program P to be executed by applying steps 106 and 107.

Steps 108, 110, 112, and optionally step 114, even step 116, are repeated as in the first embodiment until it is necessary to select a new region in the non-volatile memory 8.

Method for Protecting Against Fault Injection Attacks (Third Embodiment)

In the first and second embodiments previously described, the virtual machine M implements the steps of computing 108, execution 110, determination 112 and integrity check 114 directly from the non-volatile memory 8.

Figure 7:
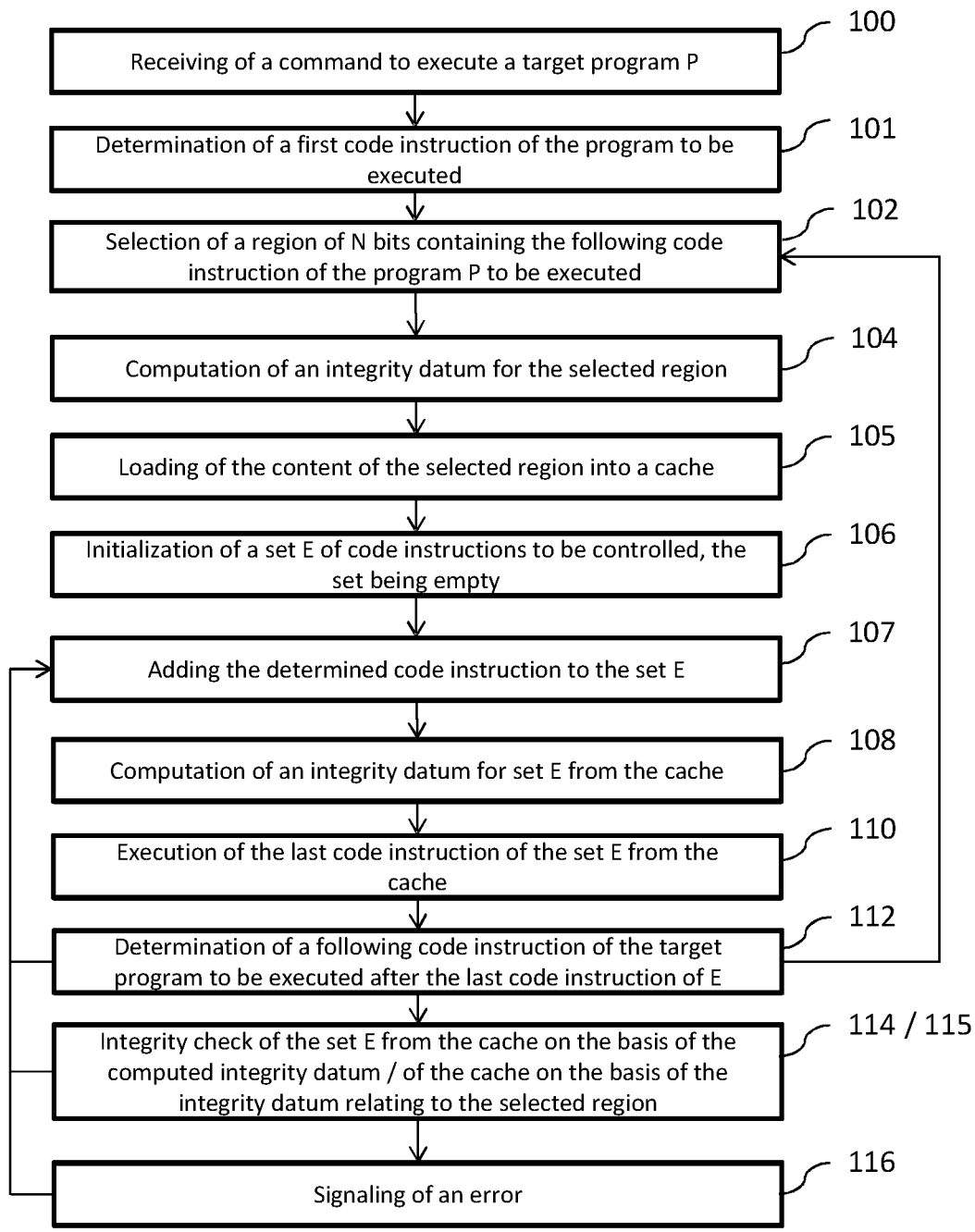
FIG. 7 is a flowchart of steps of a method for executing a program according to a second embodiment of the invention.

With reference to FIG. 7, a third embodiment of the method differs from the second embodiment previously described through the following additional features.

After having selected a region Z, of N bits, in the non-volatile memory 8 at step 102, the virtual machine M computes an integrity check value INT_NVM relating to this selected region Z (step 104). In the example illustrated in FIG. 8, the selected region Z solely comprises the code instructions Inst_1, Inst_2 and Inst_3.

The computing step 104 comprises the application of a predetermined integrity function G to the N bits of the selected region Z. The integrity datum INT_NVM is the image of this sequence of bits by the integrity function F. The integrity function G is the same as or different from the integrity function F.

Figure 8:
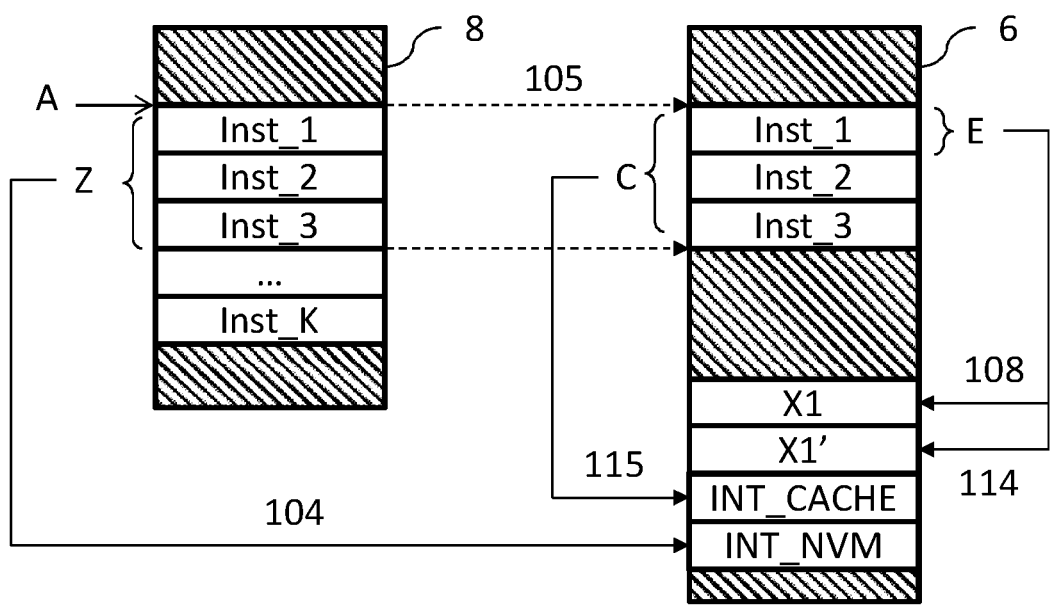
FIG. 8 illustrates the content of the memories of the device during implementation of the method according to the third embodiment of the invention.

The integrity datum INT_NVM is stored in a third memory location differing from the first location and second location. The third location is preferably a volatile memory 6 as illustrated in FIG. 8.

After the computing step 104, the content of the selected region Z is loaded in a cache C of the volatile memory 6 (step 105).

The size of the cache C is identical to that of the selected region Z (N bits).

The cache C was previously allocated to the volatile memory 6 at a preliminary step. For example, this allocation is triggered after implementing the computing step 104 of the integrity datum INT_NVM, or on receipt by the virtual machine M of a command to launch the target program P, or else beforehand at the time of launching the virtual machine M, or even earlier at the time of start-up of the electronic device 1.

The steps 107, 108, 110, 112, and optionally 114 even 116 are repeated as in the second embodiment until it is necessary to select a new region Z in the non-volatile memory 8, with the exception of the following differences.

Steps 108, 110, 112, 114 are implemented from the cache C. Set E designates code instructions loaded in the cache C. In particular:

- the computing step 108 uses an input value the code instructions contained in cache C: for example, value X1 is computed from the bits of instruction Inst_1 that is contained in cache C,
- the execution step 110 of a code instruction of the target program P is performed by reading this instruction from the cache C (which assumes that this instruction has indeed been copied into the cache C),
- the new integrity datum computed at the integrity check step 114 is computed on the basis of the code instruction(s) contained in cache C and which are included in set E.

Also, in this third embodiment, the integrity check step 114 is implemented selectively when it is determined at determination step 112 that at least one of the following conditions is met:

- the following code instruction, when executed by the processor, participates in communication of data between the electronic device and a device external to the electronic device,
- the following code instruction, when executed by the processor, participates in writing of data in a non-volatile memory 8 of the electronic device,
- the following code instruction is not contained in the cache C or is only partly contained in the cache C.

If none of these conditions are met, the integrity check 114 is not implemented.

In addition, in this third embodiment, the virtual machine M performs an integrity check of the content of cache C on the basis of the integrity datum INT_NVM previously computed at step 104 (step 115), to generate a second result.

An error may or may not be signaled as a function of the generated second result, in similar manner to step 116.

The integrity check 115 comprises sub-steps similar to those of integrity check 114:

- repeat of computing step 104 by applying the integrity function G to all the N bits contained in cache C, to produce a new integrity check value INT_CACHE,
- storing the INT_CACHE value in a fourth memory location differing from the first, second and third memory locations previously discussed, and preferably in the volatile memory 6,
- comparing the integrity data INT_NVM and INT_CACHE.

An error is selectively signaled when the compared values INT_NVM and INT_CACHE differ.

It is possible that some code instructions of the target program P, although indeed contained in the cache C, are not executed because they have been skipped further to a branch instruction executed from the cache C. This is the reason why the two integrity checks 114 and 115 carried out here do not necessarily relate to the same data: in one case, these data are the consecutive N bits contained in cache C, and in the other case the data only concern some bits contained in cache C, and only covering the code instructions loaded in cache C and referenced in set E.

If it is determined that the following code instruction is not contained in cache C or is only partly contained in cache C, the virtual machine M repeats step 102, i.e. it selects a new region Z of N bits in the non-volatile memory 8.

The loading step 105 is then repeated for the new selected region Z, as are the following steps 106, 107, 108, 110, 112, etc.

The third embodiment affords an increased security level compared with the first embodiment and second embodiment.

Method for Protecting Against Fault Injection Attacks (Fourth Embodiment)

The first embodiment and the second embodiment implement "non-cached" execution of the program i.e. no cache C in the volatile memory 6 is used. On the contrary, the third embodiment implements a "cached" execution mode of the program via the cache C assigned to the volatile memory 6.

Figure 9:
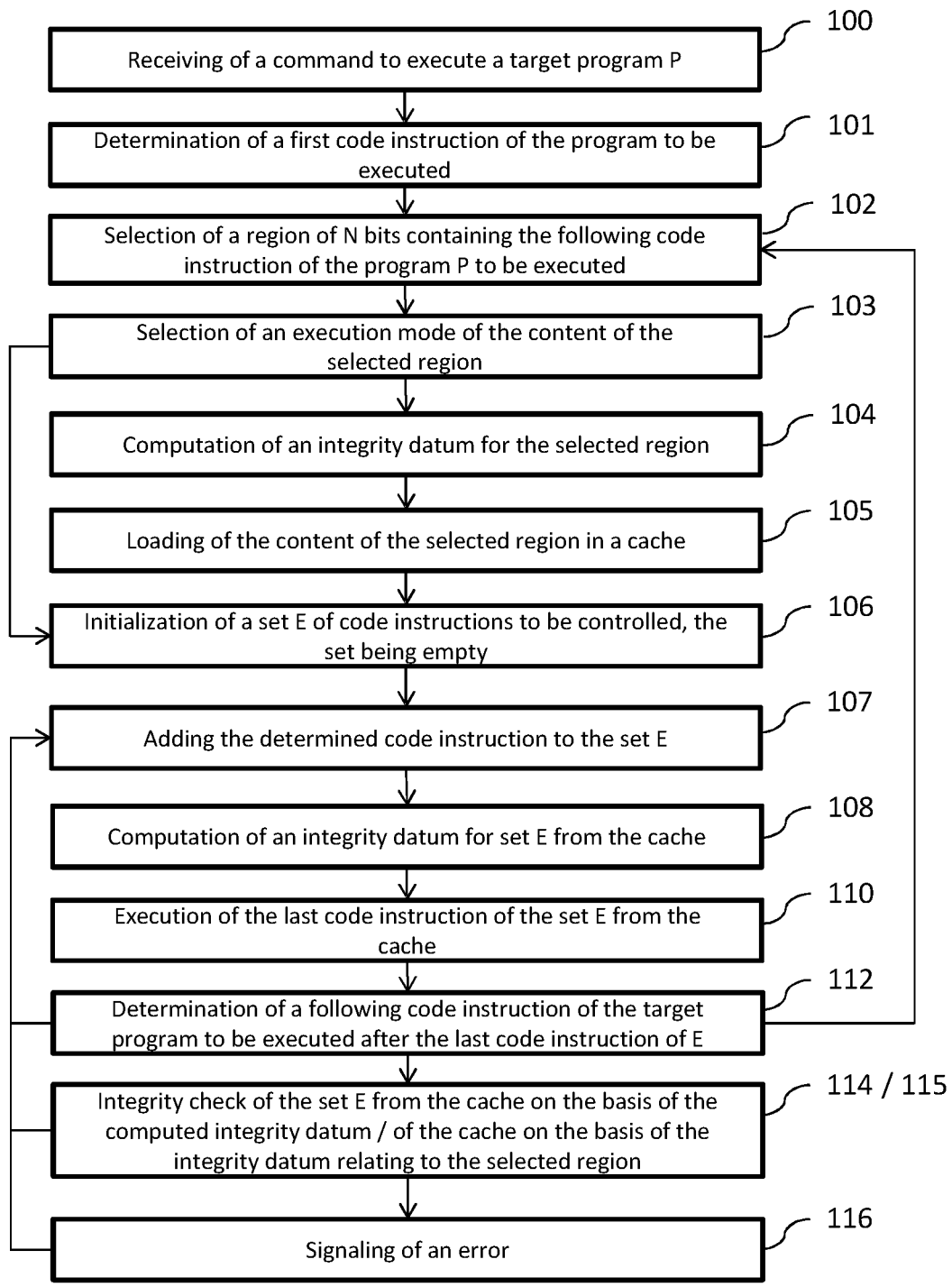
FIG. 9 illustrates the content of the memories of the device during implementation of the method according to a third embodiment of the invention.

These two different embodiments can be combined in a fourth embodiment to execute different portions of the target program P, the steps of which are illustrated in the flowchart in FIG. 9.

The selection step 102 of a region Z of N bits is carried out as in the second embodiment.

The virtual machine M selects an execution mode for the content in this region Z of N bits from among the cached execution mode and non-cached execution mode (step 103).

If the non-cached execution mode is selected at step 103, the method performs step 106 and the following steps are implemented on the portion of the target program P contained in the selected region Z of N bits, as in the second embodiment, until it is determined on an implementation of step 112 that a following code instruction of the target program P to be executed is not or is only partly contained in the selected region Z of N bits.

If the cached execution mode is selected at step 103, the method implements steps 104 and 105 before implementing steps 106 et seq. as in the third embodiment, until it is determined on an implementation of step 112 that a following code instruction of the target program P to be executed is not or is only partly contained in the cache C.

When the virtual machine M selects a new region Z of N bits containing another portion of the target program P to be executed, the virtual machine M also repeats step 103 i.e. it selects an execution mode to execute this other portion of the target program P.

The selection 103 of the execution mode varies from one portion of the target program P to another.

Preferably, the selection of an execution mode 103 is random. As a variant, the two execution modes, cached and non-cached, are selected 103 alternately (in other words the execution mode of a given portion always differs from the execution mode of a following portion of the target program P).

The fourth embodiment affords an increased security level compared with the third embodiment. It is effectively more difficult for an attacker to know where the data read by the virtual machine M are contained (cache C or region Z) over time, and hence to corrupt these data by fault injection attack.

The invention claimed is:

1. A method for executing a program (P) in an electronic device, comprising steps of:
    computing a first integrity datum (X1, X12) relating to a set (E) of code instructions of the program (P), the set (E) comprising a single code instruction (Inst_1) or a sequence of code instructions (P) to be executed consecutively (Inst_1, Inst_2),
    after computation of the first integrity datum, executing a last code instruction of the set (E) by a processor of the electronic device,
    after execution of the last code instruction, checking integrity of the set (E) on the basis of the first computed integrity datum (X1, X12), wherein said checking integrity comprises repeating the computing step to produce a second computed integrity datum (X1', X12') relating to the set (E) of code instructions of the program (P), and comparing the first computed integrity datum and second computed integrity check datum, and
    signaling or not signaling an error as a function of the result of said comparing, wherein the first computed integrity datum is computed during execution of the program (P).

2. The method according to claim 1, wherein the first computed integrity datum (X12) is computed after execution by a processor of the electronic device:
    of at least one first code instruction of the program (P) by a processor of the electronic device, or
    of at least one code instruction (Inst_1) of the set (E) differing from the last code instruction (Inst_2), or
    of each code instruction (Inst_1) of the set (E) except the last code instruction (Inst_2) of the set (E).

3. The method according to claim 1, comprising:
    after execution of the last code instruction (Inst_2) of the set (E), verifying at least one predetermined condition which may or may not be met by a following code instruction (Inst_3) of the program (P) to be executed after the last code instruction (Inst_2),
    wherein the step of checking integrity is carried out only if at least one of the conditions is met, before any execution of the following code instruction (Inst_3) by a processor of the electronic device.

4. The method according to claim 3, wherein checking integrity of the set (E) of code instructions (E) is carried out when the following code instruction (Inst_3):
    is a branch, or
    when executed by a processor of the electronic device, participates in communication of data between the electronic device and a device external to the electronic device, or
    when executed by a processor of the electronic device, participates in writing of data in a nonvolatile memory of the electronic device.

5. The method according to claim 3, wherein checking integrity of the set (E) of code instructions (E) is carried out when the following code instruction (Inst_3) is not fully contained in a predetermined memory region (Z, C) of the electronic device.

6. The method according to claim 1, further comprising steps of:
    during execution of the program (P), computing an integrity datum (INT_NVM) relating to a predetermined memory region (Z, C) of the electronic device containing the set (E) of code instructions,
    after execution of the last code instruction (Inst_2) of the set (E), checking integrity of the predetermined memory region (Z, C) on the basis of the integrity datum (INT_NVM) relating to the predetermined memory region (Z, C), to generate a second result,
    signaling or not signaling an error as a function of the second result.

7. The method according to claim 6, after execution of the last code instruction (Inst_2) of the set (E), comprising verifying at least one predetermined condition which may or may not be met by a following code instruction (Inst_3) of the program (P) to be executed after the last code instruction (Inst_2), wherein checking integrity of the predetermined memory region (Z, C) is carried out only if at least one of the predetermined conditions is met, before any execution of the following code instruction (Inst_3) by a processor of the electronic device.

8. The method according to claim 6, wherein checking integrity of the predetermined memory region (Z, C) is carried out only when the integrity check of the set (E) of code instructions is carried out.

9. The method according to claim 1, comprising loading of the set (E) of code instructions from a predetermined region (Z) of a nonvolatile memory of the electronic device into a cache (C) in a volatile memory of the electronic device, wherein the steps of computing, executing and checking integrity are carried out from the cache (C).

10. The method according to claim 9, comprising selecting an execution mode of the set (E) of code instructions from a plurality of execution modes, wherein the plurality of execution modes comprises:
  a cached execution mode, wherein loading of the set (E) of code instructions into the cache (C) is carried and wherein the steps of computing, executing and integrity checking are carried out from the cache (C), and
  a non-cached execution mode, wherein the steps of computing, executing and integrity checking are carried out directly from the predetermined region (Z) of the non-volatile memory.

11. The method according to claim 10, comprising repeating the step of selecting an execution mode for at least one code instruction of the program (P) that is not fully contained in the predetermined region (Z) of the non-volatile memory, wherein the selected execution mode varies over time.

12. The method according to claim 10, wherein the selection of the execution mode is random.

13. The method according to claim 1, further comprising steps of:
  after execution of the last code instruction (Inst_2) of the set (E), adding to the set (E) a following code instruction (Inst_3) of the program (P) to be executed after the last code instruction (Inst_2),
  after adding the following code instruction, iteratively repeating the steps of computing, executing and optionally checking integrity and signaling.

14. The method according to claim 1, further comprising steps of:
  after execution of the last code instruction (Inst_2) of the set (E), redefining the set (E) to code instruction only (Inst_3) when said code instruction (Inst_3) is not fully contained in a predetermined memory region (Z, C) of the electronic device,
  after redefining of the set (E), iteratively repeating the steps of computing, executing, and optionally checking integrity and signaling.

15. The method according to claim 13, comprising steps of:
  storing an integrity datum (X1) relating to the set (E), computed in the computing step of code instructions, in a predetermined memory location of the electronic device,
  storing an integrity datum (X12) relating to the set (E), computed on later implementation of the computing step, in the predetermined memory location so as to replace the previously stored integrity datum (X1).

16. The method according to claim 1, the steps of which are carried out by a virtual machine, wherein the program (P) is interpretable by the virtual machine.

17. A non-transitory program product comprising program code instructions (P) for executing steps of the method according to claim 1, when this method is executed by at least one processor.

* * * * *